(12) United States Patent
Riding

(10) Patent No.: US 8,222,331 B2
(45) Date of Patent: Jul. 17, 2012

(54) INJECTION MOLDED ARTICLE WITH POLY(ARYLENE ETHER)-BLOCK COPOLYMER COMPOSITION

(75) Inventor: Geoffrey H. Riding, Castleton, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/967,091

(22) Filed: Dec. 14, 2010

(65) Prior Publication Data

US 2012/0148817 A1 Jun. 14, 2012

(51) Int. Cl.
*C08L 53/02* (2006.01)
*C08K 5/521* (2006.01)
*C08G 65/40* (2006.01)

(52) U.S. Cl. .......................... 524/127; 525/68; 525/92 D

(58) Field of Classification Search .................. 524/127; 525/68, 92 D
See application file for complete search history.

(56) References Cited

U.S. PATENT DOCUMENTS

| 6,258,879 | B1 | 7/2001 | Adedeji et al. |
| 7,183,350 | B2 | 2/2007 | Balfour et al. |
| 2008/0167407 | A1* | 7/2008 | Kishore et al. ............... 524/131 |
| 2008/0245270 | A1* | 10/2008 | Klei et al. ................... 106/287.2 |
| 2010/0139944 | A1 | 6/2010 | Guo et al. |

FOREIGN PATENT DOCUMENTS

JP 2008-063537 * 3/2008

OTHER PUBLICATIONS

Kondo, electronic translation of specification of JP 2008-063537 (Mar. 2008).*

* cited by examiner

*Primary Examiner* — Jeffrey Mullis
(74) *Attorney, Agent, or Firm* — Cantor Colburn LLP

(57) ABSTRACT

An injection molded article, such as a washing machine top, exhibiting an improved balance of heat resistance, ductility, and absence of molding-related defects is formed from a poly(arylene ether)-block copolymer composition. The composition includes specific amounts of a poly(arylene ether) having particular molecular weight characteristics, a hydrogenated block copolymer, and an organophosphate ester flame retardant.

18 Claims, No Drawings

INJECTION MOLDED ARTICLE WITH POLY(ARYLENE ETHER)-BLOCK COPOLYMER COMPOSITION

BACKGROUND OF THE INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and insulation for wire and cable.

For applications requiring high heat resistance, it has been difficult to injection mold large plastic parts, such as washing machine tops. This is because known heat-resistant poly (arylene ether) blends have relatively high viscosities at the temperatures used for injection molding. The molding difficulties are manifested as defects including delamination of the molded parts, and blistering of molded parts after painting. Such defects result in waste and inefficiency. Attempts to reduce the viscosity of the poly(arylene ether) blend by increasing the melt temperature used for injection molding have been unsuccessful because the higher melt temperature induces thermal decomposition of the resin blend. Increasing the injection speed also fails to solve the problem because the increased injection speed often leads to melt fracture and blisters in the surface of the molded parts. There is therefore a need for heat-resistant poly(arylene ether) blends exhibiting improved melt flow while substantially maintaining ductility and heat resistance.

BRIEF DESCRIPTION OF THE INVENTION

One embodiment is an injection molded article comprising a composition comprising: about 79 to about 89 weight percent of a poly(arylene ether) having an intrinsic viscosity of about 0.28 to about 0.38 deciliter per gram, measured at 25° C. in chloroform, wherein the poly(arylene ether) comprises less than or equal to 6 weight percent, based on the weight of poly(arylene ether), of molecules having a molecular weight less than 5,000 atomic mass units and less than or equal to 30 weight percent, based on the weight of poly(arylene ether), of molecules having a molecular weight greater than 50,000 atomic mass units; about 3 to about 8 weight percent of a hydrogenated block copolymer of an alkenyl aromatic compound and a conjugated diene; and about 4 to about 15 weight percent of a flame retardant comprising an organophosphate ester; wherein all weight percents are based on the total weight of the composition unless a different weight basis is specified.

Another embodiment is a composition comprising: about 79 to about 89 weight percent of a poly(arylene ether) having an intrinsic viscosity of about 0.28 to about 0.38 deciliter per gram, measured at 25° C. in chloroform, wherein the poly (arylene ether) comprises less than or equal to 6 weight percent, based on the weight of poly(arylene ether), of molecules having a molecular weight less than 5,000 atomic mass units and less than or equal to 30 weight percent, based on the weight of poly(arylene ether), of molecules having a molecular weight greater than 50,000 atomic mass units; about 3 to about 8 weight percent of a hydrogenated block copolymer of an alkenyl aromatic compound and a conjugated diene; and about 4 to about 15 weight percent of a flame retardant comprising an organophosphate ester; wherein all weight percents are based on the total weight of the composition unless a different weight basis is specified.

These and other embodiments are described in detail below.

DETAILED DESCRIPTION OF THE INVENTION

The present inventors have determined that heat-resistant poly(arylene ether) compositions exhibiting improved melt flow can be obtained by blending a poly(arylene ether) with specific molecular weight characteristics with a hydrogenated block copolymer and an organophosphate ester flame retardant, all in specific amounts. As demonstrated in the working examples, the poly(arylene ether) cannot be selected on the basis of intrinsic viscosity alone. The content of low molecular weight poly(arylene ether) must be minimized to maintain ductility and heat resistance, and the content of high molecular weight poly(arylene ether) must be minimized to provide improved melt flow.

Thus, one embodiment is a composition comprising: about 79 to about 89 weight percent of a poly(arylene ether) having an intrinsic viscosity of about 0.28 to about 0.38 deciliter per gram, measured at 25° C. in chloroform, wherein the poly (arylene ether) comprises less than or equal to 6 weight percent, based on the weight of poly(arylene ether), of molecules having a molecular weight less than 5,000 atomic mass units and less than or equal to 30 weight percent, based on the weight of poly(arylene ether), of molecules having a molecular weight greater than 50,000 atomic mass units; about 3 to about 8 weight percent of a hydrogenated block copolymer of an alkenyl aromatic compound and a conjugated diene; and about 4 to about 15 weight percent of a flame retardant comprising an organophosphate ester; wherein all weight percents are based on the total weight of the composition unless a different weight basis is specified.

Another embodiment is an injection molded article comprising the composition. The composition is particularly useful for injection molding of articles having large, thin sections. Such articles include, for example, washing machine tops, solar photovoltaic junction boxes, solar photovoltaic frames, and electrical connectors. For example, the preparing injection molded article can comprising a portion having a first dimension of at least 10 centimeters, a second dimension of at least 10 centimeters, and a third dimension of less than 1 centimeter. Thus, the first and second dimensions define the "large" characteristic of the section, and the third dimension defines the "thin" characteristic of the section. The "portion" of the injection molded article can be, for example, the substantially planar face of a washing machine top. In some embodiments, the first dimension is 10 to 100 centimeters, the second dimension is 10 to 100 centimeters, and the third dimension is 0.02 to 1 centimeter. In some embodiments, the first dimension is 30 to 100 centimeters, the second dimension is 30 to 100 centimeters, and the third dimension is 0.1 to 0.5 centimeter. In some embodiments, the ratio of first, second, and third dimensions can be about 50:50:1 to about 1,000:1,000:1.

Methods and apparatus for injection molding are known in the art, and a specific embodiment of injection molding conditions is described in the working examples below. In some embodiments, the molding method comprises using a melt temperature of about 300 to about 340° C., specifically about 310 to about 330° C., more specifically about 315 to about 325°. In the context, the term "melt temperature" refers to the temperature of the melt as it enters the mold. In some embodiments, the molding method comprises using a mold temperature of 70 to about 110° C., specifically about 80 to about 100° C., more specifically about 85 to about 95° C.

The poly(arylene ether) used to form the composition comprises repeating structural units of the formula

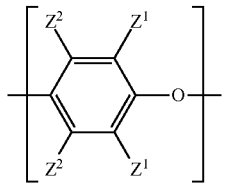

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present. In some embodiments the poly(arylene ether) comprises TMDQ end groups in an amount of less than 5 weight percent, specifically less than 3 weight percent, more specifically less than 1 weight percent, based on the weight of the poly(arylene ether). In some embodiments, the poly(arylene ether) comprises, on average, about 0.7 to about 2 moles, specifically about 1 to about 1.5 moles, of chain-terminal hydroxyl groups per mole of poly(arylene ether).

The poly(arylene ether) can be in the form of a homopolymer, a copolymer, a graft copolymer, an ionomer, or a block copolymer, as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units. In some embodiments, the poly(arylene ether) is an unfunctionalized poly(arylene ether). An unfunctionalized poly(arylene ether) is a poly(arylene ether) consisting of the polymerization product of one or more phenols. The term "unfunctionalized poly(arylene ether)" excludes functionalized poly(arylene ether)s, such as acid-functionalized poly(arylene ether)s and anhydride-functionalized poly(arylene ether)s. In some embodiments, the poly(arylene ether) comprises a poly(2,6-dimethyl-1,4-phenylene ether). In some embodiments, the poly(arylene ether) comprises a poly(arylene ether)-polysiloxane block copolymer. In other embodiments, the composition excludes poly(arylene ether)-polysiloxane block copolymer. Poly(arylene ether)-polysiloxane block copolymers, which comprise at least one poly(arylene ether) block and at least one polysiloxane block, are described, for example, in U.S. Patent Application Publication No. US 2010/0139944 A1 of Guo et al.

The poly(arylene ether) can be prepared by the oxidative coupling of monohydroxyaromatic compound(s) such as 2,6-xylenol and/or 2,3,6-trimethylphenol. Catalyst systems are generally employed for such coupling. They can contain heavy metal compounds such as copper, manganese, or cobalt compounds, usually in combination with one or more ligands such as a primary amine, a secondary amine, a tertiary amine, a halide, or a combination of two or more of the foregoing.

The poly(arylene ether) has an intrinsic viscosity of about 0.28 to about 0.38 deciliter per gram, measured at 25° C. in chloroform. Within this range, the intrinsic viscosity can be about 0.29 to about 0.37 deciliter per gram, specifically about 0.30 to about 0.36 deciliter per gram, more specifically about 0.31 to about 0.35 deciliter per gram, even more specifically about 0.32 to about 0.34 deciliter per gram. The poly(arylene ether) minimizes the amounts of low and high molecular weight species. Specifically, the poly(arylene ether) comprises less than or equal to 6 weight percent, based on the weight of poly(arylene ether), of molecules having a molecular weight less than 5,000 atomic mass units. In some embodiments, the weight percent of molecules having a molecular weight less than 5,000 atomic mass units is less than or equal to 5 weight percent, specifically less than or equal to 4 weight percent, more specifically less than or equal to 3 weight percent. The poly(arylene ether) also comprises less than or equal to 30 weight percent, based on the weight of poly(arylene ether), of molecules having a molecular weight greater than 50,000 atomic mass units. In some embodiments, the weight percent of molecules having a molecular weight greater than 50,000 atomic mass units is less than or equal to 25 weight percent, specifically less than or equal to 20 weight percent.

In some embodiments, the poly(arylene ether) has a monomodal molecular weight distribution. As used herein, the term "monomodal molecular weight distribution" means that the molecular weight distribution has a single local maximum. The term "monomodal molecular weight distribution" is intended to distinguish blends of low molecular weight and high molecular weight poly(arylene ether)s, such blends having at least two local maxima in their molecular weight distributions.

In some embodiments, the poly(arylene ether) is characterized by a weight average molecular weight and a peak molecular weight, wherein a ratio of the weight average molecular weight to the peak molecular weight is about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(arylene ether) molecular weight of the highest point in a plot of molecular weight on the x-axis versus absorbance on the y-axis.

The amount of poly(arylene ether) used to prepare the composition is about 79 to about 89 weight percent, based on the total weight of the composition. Within this range, the poly(arylene ether) amount can be about 80 to about 88 weight percent, specifically about 81 to about 87 weight percent, more specifically about 82 to about 86 weight percent, even more specifically about 83 to about 85 weight percent, yet more specifically about 82 to about 84 weight percent.

In addition to the poly(arylene ether), the composition comprises a hydrogenated block copolymer of an alkenyl aromatic compound and a conjugated diene. For brevity, this component is referred to as the "hydrogenated block copolymer". The hydrogenated block copolymer may comprise about 10 to about 90 weight percent of poly(alkenyl aromatic) content and about 90 to about 10 weight percent of hydrogenated poly(conjugated diene) content, based on the weight of the hydrogenated block copolymer. In some embodiments, the poly(alkenyl aromatic) content is about 10 to about 45 weight percent, specifically about 20 to about 40 weight percent, more specifically about 25 to about 35 weight percent, yet more specifically about 30 to about 35 weight percent. In other embodiments, the poly(alkenyl aromatic) content is about 45 weight percent to about 90 weight percent, specifically about 45 to about 80 weight percent. The hydrogenated block copolymer can have a weight average molecular weight of about 40,000 to about 400,000 atomic mass units. The number average molecular weight and the weight average molecular weight may be determined by gel permeation chromatography and based on comparison to polystyrene standards. In some embodiments, the hydrogenated block copolymer has a weight average molecular weight of about 200,000 to about 400,000 atomic mass units, specifically about 220,000 to about 350,000 atomic mass units. In other embodiments, the hydrogenated block copolymer can have a weight average molecular weight of about 40,000 to about 200,000 atomic mass units, specifically about 40,000 to about 180,000 atomic mass units, more specifically about 40,000 to about 150,000 atomic mass units.

The alkenyl aromatic monomer used to prepare the hydrogenated block copolymer can have the structure

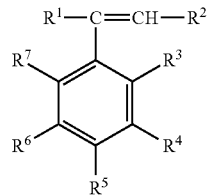

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chloro styrenes such as p-chlorostyrene, and methylstyrenes such as alpha-methylstyrene and p-methylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene.

In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the hydrogenated block copolymer includes the residue of one or more acid functionalizing agents, such as maleic anhydride.

In some embodiments, the hydrogenated block copolymer comprises a polystyrene-poly(ethylene-butylene)-polystyrene triblock copolymer.

In some embodiments, the hydrogenated block copolymer comprises a polystyrene-poly(ethylene-butylene)-polystyrene triblock copolymer having a weight average molecular weight of about 200,000 to about 400,000 atomic mass units, specifically about 240,000 to about 350,000 atomic mass units, more specifically about 240,000 to about 300,000 atomic mass units.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Polymers as KRATON G1701 and G1702; the polystyrene-poly(ethylene-butylene)-polystyrene triblock copolymers available from Kraton Polymers as KRATON G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as KRATON RP-6935 and RP-6936, the polystyrene-poly(ethylene-propylene)-polystyrene triblock copolymers available from Kraton Polymers as KRATON G1730; the maleic anhydride-grafted polystyrene-poly(ethylene-butylene)-polystyrene triblock copolymers available from Kraton Polymers as KRATON G1901, G1924, and MD-6684; the maleic anhydride-grafted polystyrene-poly(ethylene-butylene-styrene)-polystyrene triblock copolymer available from Kraton Polymers as KRATON MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polystyrene block copolymer available from Asahi Kasei Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising 60 weight polystyrene available from Kuraray as SEPTON 58104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising 65 weight percent polystyrene available from Kuraray as SEPTON S2104. Mixtures of two of more hydrogenated block copolymers can be used.

The composition comprises the hydrogenated block copolymer in an amount of about 3 to about 8 weight percent, specifically about 4 to about 7 weight percent, more specifically about 5 to about 6 weight percent, based on the total weight of the composition.

In addition to the poly(arylene ether) and the hydrogenated block copolymer, the composition comprises a flame retardant comprising an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based on bisphenols such as, for example, bisphenol A bis(diphenyl phosphate). In some embodiments, the organophosphate ester is a triaryl phosphate selected from tris(alkylphenyl) phosphate (for example, CAS No. 89492-23-9 or CAS No. 78-33-1), resorcinol bis(diphenyl phosphate) (for example, CAS No. 57583-54-7), bisphenol A bis(diphenyl phosphate) (for example, CAS No. 181028-79-5), triphenyl phosphate (for example, CAS No. 115-86-6), tris(isopropylphenyl) phosphate (for example, CAS No. 68937-41-7), and mixtures thereof.

In some embodiments the organophosphate ester comprises a bis(aryl phosphate) having the structure

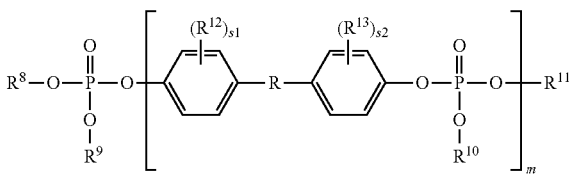

wherein R is independently at each occurrence a $C_1$-$C_{12}$ alkylidene group; $R^{12}$ and K are independently at each occurrence a $C_1$-$C_5$ alkyl group; $R^8$, $R^9$, and $R^{11}$ are independently $C_1$-$C_{12}$ hydrocarbyl; $R^{10}$ is independently at each occurrence $C_1$-$C_{12}$ hydrocarbyl; m is an integer equal to 1 to 25; and s1 and s2 are independently at each occurrence an integer equal to 0, 1, or 2. In some embodiments OR', $OR^9$, $OR^{10}$, and $OR^{11}$ are independently derived from phenol, a monoalkylphenol, a dialkylphenol, or a trialkylphenol.

The bis(aryl phosphate) is derived from a bisphenol. Exemplary bisphenols include 2,2-bis(4-hydroxyphenyl)propane (so-called bisphenol A), 2,2-bis(4-hydroxy-3-methylphenyl)propane, bis(4-hydroxyphenyl)methane, bis(4-hydroxy-3,5-dimethylphenyl)methane, and 1,1-bis(4-hydroxyphenyl)ethane. In some embodiments, the bisphenol comprises bisphenol A.

The flame retardant can, optionally, comprise one or more flame retardants in addition to the organophosphate ester. Such auxiliary flame retardants can include, for example, brominated polymers (such as brominated polystyrene), metal dialkylphosphinates (such as aluminum tris(diethyl phosphate)), nitrogen-containing flame retardants comprising a nitrogen-containing heterocyclic base and the conjugate acid of a phosphate, pyrophosphate, polyphosphate, or cyanurate base (such as melamine phosphate, melamine pyrophosphate, melamine polyphosphate, and melamine cyaurate), metal hydroxides (such as magnesium hydroxide or aluminum hydroxide), and mixtures thereof. Alternatively, in some embodiments the flame retardant consists of the organophosphate ester.

The composition comprises about 4 to about 15 weight percent of the flame retardant, based on the total weight of the composition. Within this range, the flame retardant amount can be about 5 to about 13 weight percent, specifically about 6 to about 11 weight percent, more specifically about 7 to about 9 weight percent. As the flame retardant can consist of the organophosphate ester, the above ranges can also apply to the amount of organophosphate ester.

In some embodiments, the composition further comprises one or more additives. Such additives include, for example, stabilizers, mold release agents, processing aids, drip retardants, nucleating agents, UV blockers, dyes, pigments, antioxidants, anti-static agents, mineral oil, metal deactivators, antiblocking agents, nanoclays, and electrically conductive agents. When present, the collective amount of all additives is typically about 0.5 to about 5 weight percent, specifically about 1 to about 4 weight percent, more specifically about 2 to about 4 weight percent, based on the total weight of the composition.

In some embodiments, the composition comprises less than or equal to 1 weight percent, based on the total weight of the composition, of any polymer selected from the group consisting of homopolystyrenes, rubber-modified polystyrenes, unhydrogenated block copolymers of an alkenyl aromatic compound and a conjugated diene, polyamides, polyesters, and polyolefins other than linear low density polyethylene. The collective amount of such polymers can be less than or equal to 0.5 weight percent, specifically less than or equal to 0.1 weight percent. In some embodiments, these polymers are excluded from the composition.

In some embodiments, the composition comprises linear low density polyethylene is generally used in an amount of about 0.5 to about 1.5 weight percent, specifically about 0.7 to about 1 weight percent, based on the total weight of the composition. In other embodiments, the composition comprises less than or equal to 0.5 weight percent or entirely excludes linear low density polyethylene.

In some embodiments, the composition comprises less than or equal to 1 weight percent, based on the total weight of the compositions, of any polymer other than the poly(arylene ether) and the hydrogenated block copolymer. The amount of such polymers can, optionally, be less than or equal to 0.5 weight percent, specifically less than or equal to 0.1 weight percent. In some embodiments, the composition excludes any polymer other than the poly(arylene ether) and the hydrogenated block copolymer.

In a specific embodiment, the composition comprises about 81 to about 87 weight percent of the poly(arylene ether); the poly(arylene ether) has an intrinsic viscosity of about 0.30 to about 0.36 deciliter per gram, measured at 25° C. in chloroform; the composition comprises about 4 to about 7 weight percent of the hydrogenated block copolymer; the hydrogenated block copolymer comprises a polystyrene-poly (ethylene-butylene)-polystyrene triblock copolymer having a weight average molecular weight of about 200,000 to about 400,000 atomic mass units; the composition comprises about 5 to about 10 weight percent of the flame retardant; and the flame retardant comprises resorcinol bis(diphenyl phosphate), bisphenol A bis(diphenyl phosphate), or a mixture thereof. The composition can, optionally, further comprise about 0.5 to about 5 weight percent, specifically about 1 to about 4 weight percent, more specifically about 2 to about 4 weight percent, of one or more additives selected from the group consisting of stabilizers, mold release agents, processing aids, drip retardants, nucleating agents, UV blockers, dyes, pigments, antioxidants, anti-static agents, mineral oil, metal deactivators, antiblocking agents, nanoclays, and electrically conductive agents.

In some embodiments, the composition consists essentially of the poly(arylene ether), the hydrogenated block copolymer, the flame retardant, and, optionally, about 0.5 to about 5 weight percent, specifically about 1 to about 4 weight percent, more specifically about 2 to about 4 weight percent, of one or more additives selected from the group consisting of stabilizers, mold release agents, processing aids, drip retardants, nucleating agents, UV blockers, dyes, pigments, antioxidants, anti-static agents, blowing agents, mineral oil, metal deactivators, antiblocking agents, nanoclays, and electrically conductive agents. In this context, "consisting essentially of" excludes other components in amounts that adversely affect the improved balance of melt flow, heat resistance, and ductility exhibited by the composition.

The composition can exhibit a desirable balance of melt flow, ductility, and heat-resistance properties. For example, in some embodiments, the composition exhibits a melt mass flow rate of at least 20 grams per 10 minutes, measured at 300° C. and 5 kilogram load according to ASTM D1238-10, Procedure B. The melt mass flow rate can be 20 to about 35 grams per 10 minutes, specifically about 25 to about 30 grams per 10 minutes. As one indicator of ductility, in some embodiments the composition exhibits a tensile strength at break of at least 65 megapascals, measured at 23° C. according to ASTM D638-10. The tensile strength at break can be 65 to about 75 megapascals, specifically about 68 to about 70 megapascals. As a second indicator of ductility, in some embodiments the composition exhibits a notched Izod impact strength of at least 190 joules per meter, measured at 23° C. according to ASTM D256-10. The notched Izod impact strength can be 190 to about 210 joules per meter, specifically about 195 to about 200 joules per meter. As a third indicator of ductility, in some embodiments the composition exhibits a multi-axial impact strength at failure of at least 45 joules, measured at 23° C. according to ASTM D3763-10e1. The multi-axial impact strength at failure can be 45 to about 55 joules, specifically about 47 to about 50 joules. As one indicator of heat-resistance, in some embodiments the composition can exhibit a heat deflection temperature of at least 135° C., measured according to ASTM D648-07, using Method B and a sample having a cross-sectional width of 12.5 millimeters and depth of 3.2 millimeters. The heat deflection temperature can be 135 to about 150° C., specifically about 140 to about 145° C. The composition can exhibit combinations of two or more of any of the above-described property values, or combination of three or more of any of the above-described property values.

All of the compositional variations describe above apply to the composition itself as well as to an injection molded article comprising the composition.

The invention includes at least the following embodiments.

Embodiment 1

An injection molded article comprising a composition comprising: about 79 to about 89 weight percent of a poly (arylene ether) having an intrinsic viscosity of about 0.28 to about 0.38 deciliter per gram, measured at 25° C. in chloroform; wherein the poly(arylene ether) comprises less than or equal to 6 weight percent, based on the weight of poly(arylene ether), of molecules having a molecular weight less than 5,000 atomic mass units and less than or equal to 30 weight percent, based on the weight of poly(arylene ether), of molecules having a molecular weight greater than 50,000 atomic mass units; about 3 to about 8 weight percent of a hydrogenated block copolymer of an alkenyl aromatic compound and a conjugated diene; and about 4 to about 15 weight percent of a flame retardant comprising an organophosphate ester; wherein all weight percents are based on the total weight of the composition unless a different weight basis is specified.

Embodiment 2

The injection molded article of embodiment 1, wherein the poly(arylene ether) has a monomodal molecular weight distribution.

Embodiment 3

The injection molded article of embodiment 1 or 2, wherein the hydrogenated block copolymer comprises a polystyrene-poly(ethylene-butylene)-polystyrene triblock copolymer having a weight average molecular weight of about 200,000 to about 400,000 atomic mass units.

Embodiment 4

The injection molded article of embodiment 3, wherein the polystyrene-poly(ethylene-butylene)-polystyrene triblock copolymer has a polystyrene content of about 30 to about 35 weight percent.

Embodiment 5

The injection molded article of any of embodiments 1-4, wherein the flame retardant consists of the organophosphate ester.

Embodiment 6

The injection molded article of any of embodiments 1-5, wherein the composition comprises less than or equal to 1 weight percent of any polymer selected from the group consisting of homopolystyrenes, rubber-modified polystyrenes, unhydrogenated block copolymers of an alkenyl aromatic compound and a conjugated diene, polyamides, polyesters, and polyolefins other than linear low density polyethylene.

Embodiment 7

The injection molded article of any of embodiments 1-6, wherein the composition comprises less than or equal to 1 weight percent of any polymer other than the poly(arylene ether) and the hydrogenated block copolymer.

Embodiment 8

The injection molded article of embodiment 1, wherein the composition comprises about 81 to about 87 weight percent of the poly(arylene ether); wherein the poly(arylene ether) has an intrinsic viscosity of about 0.30 to about 0.36 deciliter per gram, measured at 25° C. in chloroform; wherein the composition comprises about 4 to about 7 weight percent of the hydrogenated block copolymer; wherein the hydrogenated block copolymer comprises a polystyrene-poly(ethylene-butylene)-polystyrene triblock copolymer having a weight average molecular weight of about 200,000 to about 400,000 atomic mass units; wherein the composition comprises about 5 to about 10 weight percent of the flame retardant; and wherein the flame retardant comprises resorcinol bis(diphenyl phosphate), bisphenol A bis(diphenyl phosphate), or a mixture thereof.

Embodiment 9

The injection molded article of any of embodiments 1-8, wherein the composition consists essentially of the poly(arylene ether), the hydrogenated block copolymer, the flame retardant, and, optionally, about 0.5 to about 5 weight percent of one or more additives selected from the group consisting of stabilizers, mold release agents, processing aids, drip retardants, nucleating agents, UV blockers, dyes, pigments, antioxidants, anti-static agents, blowing agents, mineral oil, metal deactivators, antiblocking agents, nanoclays, and electrically conductive agents.

Embodiment 10

The injection molded article of any of embodiments 1-9, wherein a portion of the injection molded article comprises a first dimension of at least 10 centimeters, a second dimension of at least 10 centimeters, and a third dimension of less than or equal to 1 centimeter.

Embodiment 11

The injection molded article of any of embodiments 1-10, wherein the injection molded article is a washing machine top.

Embodiment 12

A composition comprising: about 79 to about 89 weight percent of a poly(arylene ether) having an intrinsic viscosity of about 0.28 to about 0.38 deciliter per gram, measured at 25° C. in chloroform; wherein the poly(arylene ether) comprises less than or equal to 6 weight percent, based on the weight of poly(arylene ether), of molecules having a molecular weight less than 5,000 atomic mass units and less than or equal to 30 weight percent, based on the weight of poly(arylene ether), of molecules having a molecular weight greater than 50,000 atomic mass units; about 3 to about 8 weight percent of a hydrogenated block copolymer of an alkenyl aromatic compound and a conjugated diene; and about 4 to about 15 weight percent of a flame retardant comprising an organophosphate ester; wherein all weight percents are based on the total weight of the composition unless a different weight basis is specified.

Embodiment 13

The composition of embodiment 12, wherein the poly(arylene ether) has a monomodal molecular weight distribution.

Embodiment 14

The composition of embodiment 12 or 13, wherein the hydrogenated block copolymer comprises a polystyrene-poly(ethylene-butylene)-polystyrene triblock copolymer having a weight average molecular weight of about 200,000 to about 400,000 atomic mass units.

Embodiment 15

The composition of embodiment 14, wherein the polystyrene-poly(ethylene-butylene)-polystyrene triblock copolymer has a polystyrene content of about 30 to about 35 weight percent.

Embodiment 16

The composition of any of embodiments 12-15, wherein the flame retardant consists of the organophosphate ester.

Embodiment 17

The composition of any of embodiments 12-16, comprising less than or equal to 1 weight percent of any polymer selected from the group consisting of homopolystyrenes, rubber-modified polystyrenes, unhydrogenated block copolymers of an alkenyl aromatic compound and a conjugated diene, polyamides, polyesters, and polyolefins other than linear low density polyethylene.

Embodiment 18

The composition of any of embodiments 12-17, wherein the composition comprises less than or equal to 1 weight percent of any polymer other than the poly(arylene ether) and the hydrogenated block copolymer.

Embodiment 19

The composition of embodiment 12, wherein the composition comprises about 81 to about 87 weight percent of the poly(arylene ether); wherein the poly(arylene ether) has an intrinsic viscosity of about 0.30 to about 0.36 deciliter per gram, measured at 25° C. in chloroform; wherein the composition comprises about 4 to about 7 weight percent of the hydrogenated block copolymer; wherein the hydrogenated block copolymer comprises a polystyrene-poly(ethylene-butylene)-polystyrene triblock copolymer having a weight average molecular weight of about 200,000 to about 400,000 atomic mass units; wherein the composition comprises about 5 to about 10 weight percent of the flame retardant; and wherein the flame retardant comprises resorcinol bis(diphenyl phosphate), bisphenol A bis(diphenyl phosphate), or a mixture thereof.

Embodiment 20

The composition of any of embodiments 12-19, wherein the composition consists essentially of the poly(arylene ether), the hydrogenated block copolymer, the flame retardant, and, optionally, about 0.5 to about 5 weight percent of one or more additives selected from the group consisting of stabilizers, mold release agents, processing aids, drip retardants, nucleating agents, UV blockers, dyes, pigments, antioxidants, anti-static agents, blowing agents, mineral oil, metal deactivators, antiblocking agents, nanoclays, and electrically conductive agents.

The invention is further illustrated by the following non-limiting examples.

EXAMPLE 1

Comparative Examples 1-8

Components used to prepare the working examples are summarized in Table 1.

TABLE 1

| Component | Description |
|---|---|
| PPE, 0.40 IV | Poly(2,6-dimethyl-1,4-phenylene ether), CAS Reg. No. 25134-01-4, having an intrinsic viscosity of 0.40 deciliter per gram measured in chloroform at 25° C.; obtained as PPO 640-111 from SABIC Innovative Plastics. |
| PPE, 0.33 IV | Poly(2,6-dimethyl-1,4-phenylene ether), CAS Reg. No. 25134-01-4, having an intrinsic viscosity of 0.33 deciliter per gram measured in chloroform at 25° C.; obtained as PPO 630-111 from SABIC Innovative Plastics. |
| PPE, 0.12 IV | Poly(2,6-dimethyl-1,4-phenylene ether), CAS Reg. No. 25134-01-4, having an intrinsic viscosity of 0.12 deciliter per gram measured in chloroform at 25° C.; obtained as PPO SA120-111 from SABIC Innovative Plastics. |
| SEBS | Polystyrene-poly(ethylene-butylene)-polystyrene triblock copolymer, CAS Reg. No. 66070-58-4, having a polystyrene content of 33% and a weight average molecular weight of about 240,000-300,000, obtained as KRATON G1651 from Kraton Polymers Ltd. |
| RDP | Resorcinol bis(diphenyl phosphate), CAS Reg. No. 57583-54-7, obtained as FYROLFLEX RDP from ICL-IP America Inc. |
| ZnS | Zinc sulfide, CAS Reg. No. 1314-98-3, obtained as SACHTOLITH HD, from Sachtleben Corp. |
| LLDPE | Linear low density polyethylene, CAS Reg. No. 25087-34-7, obtained as NOVAPOL GM2024-A from Nova Chemicals. |
| Stabilizer | Propanoic acid, 3-(dodecylthio)-1,1-[2,2-bis[[3-(dodecylthio)-1-oxopropoxy]methyl]-1,3-propanediyl] ester, CAS Reg. No. 29598-76-3, obtained as SEENOX 412S, from Haruno Sangyo. |
| MgO | Magnesium oxide, CAS Reg. No. 1309-48-4, obtained as ELASTOMAG 170 from Western Reserve. |
| Carbon black | Carbon black, having an iodine number of about 142 milligrams per gram measured according to ASTM D1510, and a density of 352 kilogram per cubic meter measured according to ASTM D1513, obtained as VULCAN 9A32, from Cabot Corporation. |

Compositions are summarized in Table 2, where all component amounts are in parts by weight. All compositions were prepared on a Werner & Pfleiderer 30 millimeter co-rotating twin-screw extruder having a length-to-diameter ratio of 32:1 and operating at 350 rotations per minute and 45 pounds per hour (20.4 kilograms/hour) feed rate. A mild screw design was used to maintain the melt temperature below 635° F. (335° C.). Liquid flame retardant was pumped directly into the extruder at barrel 2. Zone set temperatures were 240-260-300-300-300-300° C. from feed throat to die. After cooling the extrudate through a water bath and pelletizing, test specimens were prepared by injection molding using a target melt temperature of 605° F. (318.3° C.) and a mold temperature of 190° F. (87.8° C.).

Properties are summarized in Table 2. Tensile strength at yield (expressed in megapascals) and tensile elongation at break (expressed in percent) were measured at 23° C. according to ASTM D638-10. Flexural modulus (expressed in megapascals) and flexural strength (expressed in megapascals) were measured at 23° C. according to ASTM D790-10. Notched Izod impact strength (expressed in joules per meter), was measured at 23° C. according to ASTM D256-10. Multi-axial impact strength at failure (expressed in joules), was measured at 23° C. according to ASTM D3763-10e1. Heat deflection temperature (expressed in degrees centigrade), was measured according to ASTM D648-07, using Method B and a sample having a cross-sectional width of 12.5 millimeters and depth of 6.4 millimeters. Melt mass flow rate (expressed in grams per 10 minutes), was measured at 300° C. and 5 kilogram load according to ASTM D1238-10, Procedure B.

TABLE 2

| | C. Ex. 1 | C. Ex. 2 | Ex. 1 | C. Ex. 3 | C. Ex. 4 |
|---|---|---|---|---|---|
| COMPOSITION | | | | | |
| PPE, 0.40 IV | 83.78 | 41.89 | 0 | 83.78 | 80.78 |
| PPE, 0.33 IV | 0 | 41.89 | 83.78 | 0 | 0 |
| PPE, 0.12 IV | 0 | 0 | 0 | 0 | 3.00 |
| ZnS | 0.13 | 0.13 | 0.13 | 0.13 | 0.13 |
| Stabilizer | 1.08 | 1.08 | 1.08 | 1.08 | 1.08 |
| LLDPE | 0.90 | 0.90 | 0.90 | 0.90 | 0.90 |
| SEBS | 5.52 | 5.52 | 5.52 | 5.52 | 5.52 |
| RDP | 7.81 | 7.81 | 7.81 | 7.81 | 7.81 |
| MgO | 0.27 | 0.27 | 0.27 | 0.27 | 0.27 |
| Carbon black | 0.50 | 0.50 | 0.50 | 0.50 | 0.50 |
| PROPERTIES | | | | | |
| Tensile strength at break (MPa) | 69.38 | 68.76 | 68.02 | 69.66 | 69.86 |
| Tensile elongation at break (%) | 24.80 | 12.20 | 14.36 | 27.40 | 22.00 |
| Flexural modulus (MPa) | 2532 | 2554 | 2537 | 2541 | 2575 |
| Flexural strength (MPa) | 103.4 | 104.5 | 103.6 | 104.4 | 106.2 |
| Notched Izod (J/m) | 255 | 223 | 197 | 235 | 239 |
| Energy at failure (J) | 56.10 | 47.30 | 49.00 | 52.10 | 60.20 |
| Heat deflection temperature (° C.) | 145 | 143 | 143 | 146 | 143 |
| Melt flow rate (g/10 min.) | 9.90 | 18.04 | 28.18 | 12.32 | 12.89 |

| | C. Ex. 5 | C. Ex. 6 | C. Ex. 7 | C. Ex. 8 |
|---|---|---|---|---|
| COMPOSITION | | | | |
| PPE, 0.40 IV | 77.85 | 74.89 | 71.93 | 68.98 |
| PPE, 0.33 IV | 0 | 0 | 0 | 0 |
| PPE, 0.12 IV | 6.00 | 9.00 | 12.00 | 15.00 |
| ZnS | 0.13 | 0.13 | 0.13 | 0.13 |
| Stabilizer | 1.08 | 1.08 | 1.08 | 1.08 |
| LLDPE | 0.90 | 0.90 | 0.90 | 0.90 |
| SEBS | 5.52 | 5.52 | 5.52 | 5.52 |
| RDP | 7.81 | 7.81 | 7.81 | 7.81 |

TABLE 2-continued

|  | | | | |
|---|---|---|---|---|
| MgO | 0.27 | 0.27 | 0.27 | 0.27 |
| Carbon black | 0.50 | 0.50 | 0.50 | 0.50 |
| PROPERTIES | | | | |
| Tensile strength at break (MPa) | 69.60 | 70.14 | 69.62 | 69.10 |
| Tensile elongation at break (%) | 16.20 | 13.80 | 12.60 | 11.48 |
| Flexural modulus (MPa) | 2598 | 2617 | 2627 | 2630 |
| Flexural strength (MPa) | 106.7 | 107.4 | 107.6 | 106.5 |
| Notched Izod (J/m) | 231 | 210 | 197 | 174 |
| Energy at failure (J) | 54.40 | 48.90 | 53.90 | 46.00 |
| Heat deflection temperature (° C.) | 142 | 139 | 138 | 137 |
| Melt flow rate (g/10 min.) | 13.79 | 15.12 | 17.48 | 21.54 |

The results for heat deflection temperature and melt flow index show that Example 1, using a poly(arylene ether) having an intrinsic viscosity of about 0.33 deciliter per gram, achieves a substantial increase in melt flow while largely preserving heat resistance. This combination of properties could not be achieved when using a poly(arylene ether) having an intrinsic viscosity of 0.40 deciliter per gram (Comparative Examples 1 and 3), or with blends of poly(arylene ether)s having intrinsic viscosities of 0.40 and 0.12 (Comparative Examples 4-8). It is particularly surprising that Example 1, using a poly(arylene ether) having an intrinsic viscosity of about 0.33 deciliter per gram, exhibited about the same heat deflection temperature but much greater melt flow than a composition using a 50:50 blend of 0.40 and 0.33 intrinsic viscosity poly(arylene ether)s (Comparative Example 2).

The improvement in melt flow allowed the molding of washing machine parts with a substantially reduced scrap rate, while substantially maintaining the heat resistance and ductility of the molded articles.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. An injection molded article comprising a composition comprising:
   about 79 to about 89 weight percent of a poly(arylene ether) having an intrinsic viscosity of 0.28 to 0.38 deciliter per gram, measured at 25° C. in chloroform; wherein the poly(arylene ether) consists of poly(2,6-dimethyl-1,4-phenylene ether) and comprises less than or equal to 6 weight percent, based on the weight of poly(arylene ether), of molecules having a molecular weight less than 5,000 atomic mass units and less than or equal to 30 weight percent, based on the weight of poly(arylene ether), of molecules having a molecular weight greater than 50,000 atomic mass units;
   about 3 to about 8 weight percent of a hydrogenated block copolymer of an alkenyl aromatic compound and a conjugated diene; and
   about 4 to about 15 weight percent of a flame retardant comprising an organophosphate ester;
   wherein the composition comprises less than or equal to 0.5 weight percent of any polymer other than the poly(arylene ether) and the hydrogenated block copolymer; and
   wherein all weight percents are based on the total weight of the composition unless a different weight basis is specified.

2. The injection molded article of claim 1, wherein the poly(arylene ether) has a monomodal molecular weight distribution.

3. The injection molded article of claim 1, wherein the hydrogenated block copolymer comprises a polystyrene-poly(ethylene-butylene)-polystyrene triblock copolymer having a weight average molecular weight of about 200,000 to about 400,000 atomic mass units.

4. The injection molded article of claim 3, wherein the polystyrene-poly(ethylene-butylene)-polystyrene triblock copolymer has a polystyrene content of about 30 to about 35 weight percent.

5. The injection molded article of claim 1, wherein the flame retardant consists of the organophosphate ester.

6. The injection molded article of claim 1, wherein the composition comprises less than or equal to 0.1 weight percent of any polymer other than the poly(arylene ether) and the hydrogenated block copolymer.

7. The injection molded article of claim 1,
   wherein the composition comprises about 81 to about 87 weight percent of the poly(arylene ether);
   wherein the poly(arylene ether) has an intrinsic viscosity of 0.30 to 0.36 deciliter per gram, measured at 25° C. in chloroform;
   wherein the composition comprises about 4 to about 7 weight percent of the hydrogenated block copolymer;
   wherein the hydrogenated block copolymer comprises a polystyrene-poly(ethylene-butylene)-polystyrene triblock copolymer having a weight average molecular weight of about 200,000 to about 400,000 atomic mass units;
   wherein the composition comprises about 5 to about 10 weight percent of the flame retardant; and
   wherein the flame retardant comprises resorcinol bis(diphenyl phosphate), bisphenol A bis(diphenyl phosphate), or a mixture thereof.

8. The injection molded article of claim 1, wherein the composition consists essentially of the poly(arylene ether), the hydrogenated block copolymer, the flame retardant, and, optionally, about 0.5 to about 5 weight percent of one or more additives selected from the group consisting of stabilizers, mold release agents, processing aids, drip retardants, nucleating agents, UV blockers, dyes, pigments, antioxidants, anti-static agents, blowing agents, mineral oil, metal deactivators, antiblocking agents, nanoclays, and electrically conductive agents.

9. The injection molded article of claim 1, wherein a portion of the injection molded article comprises
 a first dimension of at least 10 centimeters,
 a second dimension of at least 10 centimeters, and
 a third dimension of less than or equal to 1 centimeter.

10. The injection molded article of claim 1, wherein the injection molded article is a washing machine top.

11. A composition comprising:
 about 79 to about 89 weight percent of a poly(arylene ether) having an intrinsic viscosity of 0.28 to 0.38 deciliter per gram, measured at 25° C. in chloroform; wherein the poly(arylene ether) consists of poly(2,6-dimethyl-1,4-phenylene ether) and comprises less than or equal to 6 weight percent, based on the weight of poly(arylene ether), of molecules having a molecular weight less than 5,000 atomic mass units and less than or equal to 30 weight percent, based on the weight of poly(arylene ether), of molecules having a molecular weight greater than 50,000 atomic mass units;
 about 3 to about 8 weight percent of a hydrogenated block copolymer of an alkenyl aromatic compound and a conjugated diene; and
 about 4 to about 15 weight percent of a flame retardant comprising an organophosphate ester;
 wherein the composition comprises less than or equal to 0.5 weight percent of any polymer other than the poly(arylene ether) and the hydrogenated block copolymer; and
 wherein all weight percents are based on the total weight of the composition unless a different weight basis is specified.

12. The composition of claim 11, wherein the poly(arylene ether) has a monomodal molecular weight distribution.

13. The composition of claim 11, wherein the hydrogenated block copolymer comprises a polystyrene-poly(ethylene-butylene)-polystyrene triblock copolymer having a weight average molecular weight of about 200,000 to about 400,000 atomic mass units.

14. The composition of claim 13, wherein the polystyrene-poly(ethylene-butylene)-polystyrene triblock copolymer has a polystyrene content of about 30 to about 35 weight percent.

15. The composition of claim 11, wherein the flame retardant consists of the organophosphate ester.

16. The composition of claim 11, wherein the composition comprises less than or equal to 0.1 weight percent of any polymer other than the poly(arylene ether) and the hydrogenated block copolymer.

17. The composition of claim 11,
 wherein the composition comprises about 81 to about 87 weight percent of the poly(arylene ether);
 wherein the poly(arylene ether) has an intrinsic viscosity of 0.30 to 0.36 deciliter per gram, measured at 25° C. in chloroform;
 wherein the composition comprises about 4 to about 7 weight percent of the hydrogenated block copolymer;
 wherein the hydrogenated block copolymer comprises a polystyrene-poly(ethylene-butylene)-polystyrene triblock copolymer having a weight average molecular weight of about 200,000 to about 400,000 atomic mass units;
 wherein the composition comprises about 5 to about 10 weight percent of the flame retardant; and
 wherein the flame retardant comprises resorcinol bis(diphenyl phosphate), bisphenol A bis(diphenyl phosphate), or a mixture thereof.

18. The composition of claim 11, wherein the composition consists essentially of the poly(arylene ether), the hydrogenated block copolymer, the flame retardant, and, optionally, about 0.5 to about 5 weight percent of one or more additives selected from the group consisting of stabilizers, mold release agents, processing aids, drip retardants, nucleating agents, UV blockers, dyes, pigments, antioxidants, anti-static agents, blowing agents, mineral oil, metal deactivators, antiblocking agents, nanoclays, and electrically conductive agents.

* * * * *